United States Patent Office 2,980,714
Patented Apr. 18, 1961

2,980,714
20 - KETO - 16α - LOWER - ALKOXYMETHYLATED STEROIDS AND PROCESS FOR THEIR PREPARATION

Georges Muller, Nogent-sur-Marne, and Milutin Stefanovic, Paris, France, assignors to Les Laboratoires Français de Chimiotherapie, Paris, France, a corporation of France No Drawing. Filed Dec. 10, 1959, Ser. No. 858,589

Claims priority, application France May 22, 1959

12 Claims. (Cl. 260—397.45)

The present invention relates to alkoxymethylated steroids and a process for their preparation.

More particularly, the invention has as its object the obtention of 20 - keto - 16α - alkoxymethylated steroids, which are physiologically active compounds having anti-inflammatory activity and, in addition, represent valuable intermediates for the synthesis of other important compounds having a therapeutic or hormone activity.

An object of the invention is the obtention of 20-keto-16α-alkoxymethylated steroids of the structural formula:

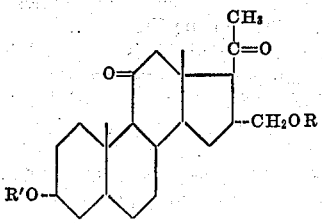

wherein R represents a lower alkyl radical and R' represents a member selected from the group consisting of hydrogen, lower alkanoyl and monocyclic hydrocarbon aroyl radicals and the process for the obtention of said steroids.

A further object of this invention is the obtention of intermediates useful in the synthesis of the 20-keto-16α-alkoxymethylated steroids such as 3α-benzoyl-Δ16-pregnene-11,20-dione.

These and other objects will become more apparent as the description of the invention proceeds.

We have found that 20-keto-16α-alkoxymethylated steroids having the structural formula:

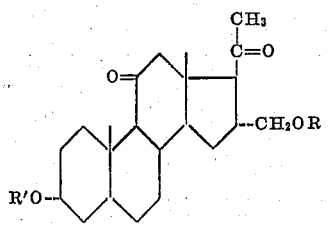

wherein R represents a lower alkyl radical and R' represents a member selected from the group consisting of hydrogen, lower alkanoyl and monocyclic hydrocarbon aroyl radicals can be obtained easily according to the process exemplified in the flow diagram of Table I below and the description which follows this table.

TABLE I

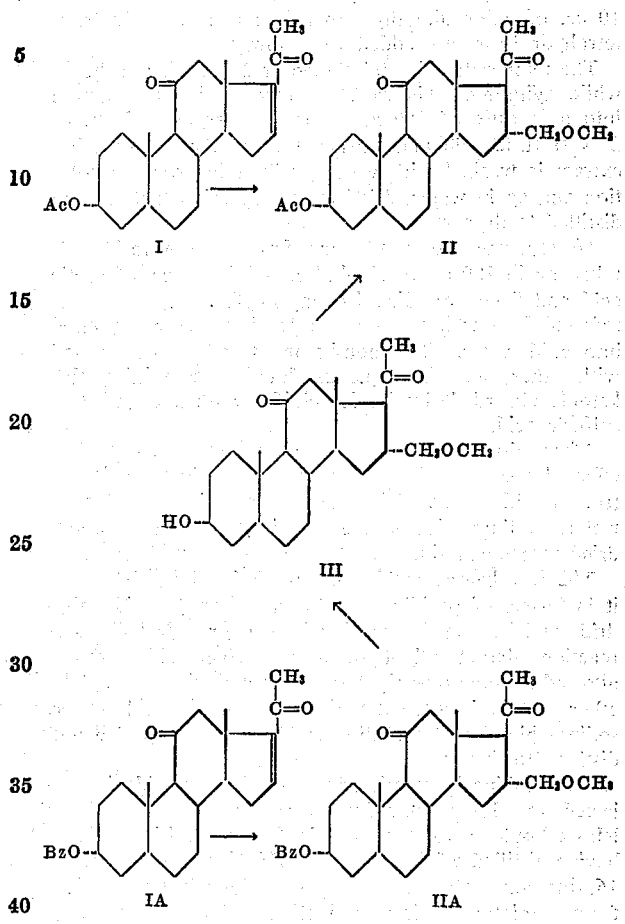

Ac represents the acetyl radical.
Bz represents the benzoyl radical.

The process which is the object of the present invention consists essentially of reacting a lower alkoxymethyl magnesium halide with a 20-keto-Δ16-steroid such as the acylated 3α-hydroxy-Δ16-pregnene-11,20-diones to obtain, after acid hydrolysis of the intermediate magnesium compound formed, preferably with an aqueous solution of a strong mineral acid such as sulfuric acid, the corresponding 20-keto-16α-alkoxymethyl steroid.

The reaction is effected in solution in a cycloalkylene ether, such as tetrahydrofuran, 2-methyl-tetrahydrofuran or tetrahydropyran, and in the presence of a halide of a metal of the second group of the periodic table of elements, such as the chloride of zinc, mercury or cadmium. The reaction is carried out at temperatures between about —20° C. and about +20° C., preferably at temperatures in the neighborhood of 0° C.

The following examples illustrate the invention without however, limiting it. It will be understood to one skilled in the art, that many changes and modifications in the reactants and in the reaction conditions can be made.

The temperatures are given in degrees centigrade.

Example 1

PREPARATION OF 3α-ACETOXY-16α-METHOXY-METHYL-PREGNANE-11,20-DIONE (II)

2.5 gm. of magnesium turnings and 100 mgm. of mercuric chloride are introduced into 45 cc. of anhydrous tetrahydrofuran, and the mixture is agitated for 15 minutes at 20° C. A grayish suspension is formed to which 10 gm. of 3α-acetoxy-$\Delta^{16}$-pregnene-11,20-dione (I) (Arth et al., J. Am. Chem. Soc. 80, 3160 (1958), Oliveto et al., J. Am. Chem. Soc. 80, 4428 (1958)) in 50 cc. of anhydrous tetrahydrofuran are added, and then 10 cc. of chlorodimethyl ether in 50 cc. of anhydrous tetrahydrofuran are added very slowly.

The temperature is maintained at 20° C. for 16 hours while agitating. The reaction mixture is then poured into a mixture of 150 cc. of iced water and 30 cc. of 2 N sulfuric acid and extracted with ether. The ether extract is washed with water, sodium bicarbonate solution and again water, dried over magnesium sulfate and distilled to dryness.

To separate the non-ketone fraction, the residue is taken up in 100 cc. of alcohol containing 5 cc. of acetic acid and 5 gm. of Girard's reagent T. The mixture is refluxed for one hour, concentrated in vacuo and poured into cold water. The non-ketone fraction is extracted with ether and the aqueous fraction containing the ketonic Girard derivative is acidified with 5 cc. of 2 N sulfuric acid.

After allowing it to stand for an hour and a half to effect hydrolysis, the liberated ketone fraction is extracted with ether. The ether extract is washed with water, sodium bicarbonate solution and again water, dried over magnesium sulfate and distilled to dryness.

The raw ketone residue is re-acetylated by dissolving it in 20 cc. of pyridine and 20 cc. of acetic acid anhydride and heating the solution for 1 hour at 80° C. The reaction mixture is then poured into 100 cc. of iced water, allowed to stand overnight and extracted with ether. The ether extract is washed with 2 N sulfuric acid, water, sodium bicarbonate solution and again water, dried and distilled to dryness.

This residue in solution in methylene chloride is subjected to chromatography over alumina prepared by Rhone-Poulenc to separate further impurities. After having distilled off the methylene chloride the 3α-acetoxy-16α-methoxymethyl-pregnane-11,20-dione (II) crystallizes from a mixture of isopropyl ether and petroleum ether (2:1). The crystals have a melting point of 147° C. and a specific rotation of $[\alpha]_D^{20} = +111°$ (c.=0.5% in chloroform).

Analysis.—$C_{25}H_{38}O_5$; molecular weight—418.5. Calculated: C, 71.7%; H, 9.15%. Found: C, 71.7%; H, 9.0%.

Compound II is soluble in alcohol, acetone, benzene and chloroform, slightly soluble in ether and insoluble in water and dilute acids and alkalies.

It is not described in the literature.

Example 2

PREPARATION OF 3α-ACETOXY-16α-METHOXYMETHYL-PREGNANE-11,20-DIONE (II)

The mode of operation of Example 1 was followed, but the chlorodimethyl ether was replaced by bromodimethyl ether and the operating temperature was held between 0 and +5° C.

After treatment with Girard's reagent T and reacetylation of the ketone fraction the product is crystallized directly from isopropyl ether. Between 4.2 and 4.8 gm. of 3α-acetoxy-16α-methoxymethyl-pregnane-11,20-dione (II) (which is about 40% of the theoretical yield) are thus separated. This product has a melting point of 147° C. and a specific rotation of $[\alpha]_D^{20} = +111°$ (chloroform). This compound is not described in the literature.

Example 3

PREPARATION OF 3α-BENZOXY-16α-METHOXYMETHYL-PREGNANE-11,20-DIONE (IIA).

2.5 gm. of magnesium turnings and 500 mgm. of mercuric chloride are introduced into 50 cc. of anhydrous tetrahydrofuran, the mixture is agitated for 10 minutes. Then 10 cc. of bromodimethyl ether in 50 cc. of tetrahydrofuran are added over a period of 20 minutes at +5° C. 10 gm. of 3α-benzoxy-$\Delta^{16}$-pregnene-11,20-dione (Ia) (M.P.=208° C.) in 50 cc. of anhydrous tetrahydrofuran are then added rapidly while maintaining the temperature at +5° C. The mixture is allowed to stand for half an hour, then poured into iced water. The ice water mixture is acidified with a 10% solution of sulfuric acid after having added a large quantity of ethyl ether. The ether phase is washed with water, then with a sodium bicarbonate solution and again with water, dried over magnesium sulfate and distilled to dryness. The residual resin is taken up in ether and allowed to stand overnight.

The next morning it is vacuum filtered. The filter cake is washed with ether and dried in a drying chamber. The product, 3α-benzoxy-16α-methoxymethyl-pregnane-11,20-dione (IIA) melts at 205° C. and produces a melting point depression of more than 20° C. in admixture with the starting material. It has a specific rotation of $[\alpha]_D^{20} = +98°$ (c.=0.5% in chlorofrom).

Analysis.—$C_{30}H_{40}O_5$; molecular weight 480.6. Calculated: C, 75.0%; H, 8.4%. Found: C, 74.8; H, 8.4.

Compound IIA is obtained in the form of colorless crystals which are soluble in acetone, benzene and chloroform, slightly soluble in alcohol and insoluble in ether, water and dilute aqueous acids and alkalies.

It is not described in the literature.

The starting compound IA is prepared in the following manner: 12.6 gm. of 3α-hydroxy-$\Delta^{16}$-pregnene-11,20-dione are dissolved in 100 cc. of pyridine and to the resulting solution 25 cc. of benzoyl chloride are very slowly added. As soon as the benzoyl chloride is introduced a precipitate of pyridine hydrochloride is formed and the solution turns red. The solution is heated at 80° C., while stirring, for one and a half hours, and is then poured into a mixture of 500 cc. of iced water and 125 cc. of concentrated hydrochloric acid. The mixture is vacuum filtered. The filter cake is washed with water, with dilute hydrochloric acid and again with water, and is taken up in 100 cc. of ether. After heating the mixture under reflux for 10 minutes, it is cooled and vacuum filtered. The filter cake is washed with ether and dried at 100° C. to obtain 11.6 gm. (which is 70% of theory) of 3α-benzoxy-$\Delta^{16}$-pregnene-11,20-dione (IA), M.P.=208° C. The product may be used, as such, for the preparation of Compound IIA.

For analysis, it is purified by dissolving it in 2 volumes of methylene chloride, an equal volume of methanol is added to this solution, and the mixture is concentrated until crystallization begins. After allowing it to stand for half an hour at 0° C. the mixture is vacuum filtered. The filter cake is washed with methanol and dried at 100° C. The pure product Ia has a melting point of 208° C. and a specific rotation of $[\alpha]_D^{20} = +112°$ (c.=0.5% in chloroform). Yield of purification: 95%.

Analysis.—$C_{28}H_{34}O_4$; molecular weight—434.5. Calculated: C, 77.39%; H, 7.89%; O, 14.73%. Found: C, 77.5%; H, 8.0%; O, 14.9%.

This compound is soluble in acetone, benzene and chloroform, very slightly soluble in alcohol and insoluble in ether and water.

It is not described in the literature.

Example 4

PREPARATION OF 3α-ACETOXY-16α-METHOXYMETHYL-PREGNANE-11,20-DIONE (II) STARTING WITH 3α-BENZOXY-16α-METHOXYMETHYL-PREGNANE-11,20-DIONE (IIA) BY SAPONIFICATION WITH AN ALCOHOLIC ALKALI METAL HYDROXIDE AND ACETYLATION WITH ACETIC ACID ANHYDRIDE OR CHLORIDE 1.0 gm. of compound IIA is dissolved in 30 cc. of 1 N alcoholic potassium hydroxide and the resulting solution is refluxed for 2 to 5 minutes until all has dissolved. The solution is then allowed to stand for half an hour at room temperature, poured into water and extracted with ethyl ether. The extract solutions are successively washed with hydrochloric acid, water, a saturated aqueous solution of sodium bicarbonate and again with water, dried and distilled to dryness yielding 3α-hydroxy-16α-methoxymethyl-pregnane-11,20-dione (III) which is recrystallized from isopropyl ether and has a melting point of 126° C.

Analysis.—$C_{23}H_{36}O_4$; molecular weight—376.5. Calculated: C, 73.4%; H, 9.6%. Found: C, 73.4%; H, 9.6%.

This compound is not described in the literature.

900 mgm. of raw compound III are dissolved in 3 cc. of pyridine, 3 cc. of acetic acid anhydride are added and the reaction mixture is allowed to stand at room temperature for two hours. It is then poured into 100 cc. of iced water and extracted with ether. The ether extract is washed with water, dilute hydrochloric acid, water, a saturated aqueous solution of sodium bicarbonate and finally again with water. After distillation to dryness and recrystallization from isopropyl ether, 654 mgm. (which is 72% of theory) of 3α-acetoxy-16α-methoxymethyl-pregnane-11,20-dione (II) which is identical to the product described in Example 1, are obtained.

While we have disclosed several specific embodiments of our invention, it is to be understod that the process is operative with other reactants. For example, other ethers may be used to form the lower alkoxymethyl magnesium halide starting materials, such halo-methyl-lower alkyl ethers are chloromethyl ethyl ether, iodomethyl butyl ether, etc. In addition other steroids containing the 17-acetyl group and a double bond in the 16 position will undergo the reaction;

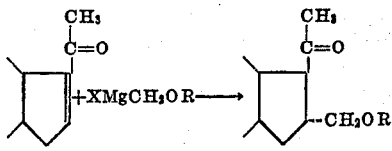

Other changes and modifications which would occur to one skilled in the art may be made without departing from the spirit of the invention or the scope of the appended claims.

We claim:
1. 20-keto-16α-alkoxymethylated steroids having the structural formula:

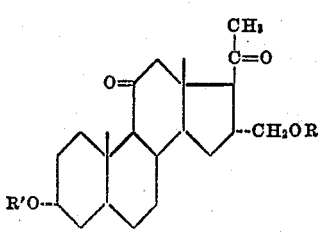

wherein R represents a lower alkyl radical and R' represents a member selected from the group consisting of hydrogen, lower alkanoyl and monocyclic hydrocarbon aroyl radicals.

2. 3α - acetoxy - 16α - methoxymethyl - pregnane-11,20-dione.

3. 3α - benzoxy - 16α - methoxymethyl-pregnane-11,20-dione.

4. 3α - hydroxy - 16α - methoxymethyl-pregnane-11,20-dione.

5. The process of producing a 20-keto-16α-alkoxymethylated steroid which comprises the steps of reacting a 3α-acyloxy-Δ16-pregnene-11,20-dione wherein acyloxy represents a member selected from the group consisting of lower alkanoyloxy and cyclic hydrocarbon aroyloxy, with a lower alkoxymethyl magnesium halide in a cycloalkylene ether, hydrolyzing the intermediate magnesium compound formed by treatment with a strong mineral acid and recovering a 20-keto-16α-alkoxymethylated steroid having the structural formula:

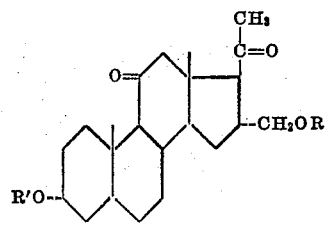

wherein R represents a lower alkyl radical and R' represents a member selected from the group consisting of hydrogen, lower alkanoyl and monocyclic hydrocarbon aroyl radicals.

6. The proces of claim 5 wherein the reaction of the said steroid and said halide occurs in the presence of a halide of a metal selected from the group consisting of zinc, mercury and cadmium.

7. The process of claim 5 wherein the reaction between said steroid and said halide is carried out at a temperature of between about —20° C. and about +20° C.

8. The process of claim 5 wherein the introduction of the said steroid into the reaction mixture occurs before the formation of said lower alkoxymethyl magnesium halide.

9. The process of claim 5 wherein said steroid is introduced into the reaction mixture after the formation of said lower alkoxymethyl magnesium halide.

10. The process of producing 3α-acetoxy-16α-methoxymethyl-pregnane-11,20-dione which comprises the steps of reacting a solution of 3α-acetoxy-Δ16-pregnene-11,20-dione in anhydrous tetrahydrofuran with a methoxymethyl magnesium halide in the presence of mercuric chloride at a temperature between about —20° C. and about +20° C., hydrolyzing the intermediate magnesium compound formed by treatment with an aqueous solution of a strong mineral acid and recovering said 3α-acetoxy-16α-methoxymethyl-pregnane-11,20-dione.

11. The proces of producing 3α-benzoxy-16α-methoxymethyl-pregnane-11,20-dione which comprises the steps of reacting a solution of 3α-benzoxy-Δ16-pregnene-11,20-dione in anhydrous tetrahydrofuran with a methoxymethyl magnesium halide in the presence of mercuric chloride at a temperature between about —20° C. and about +20° C., hydrolyzing the intermediate magnesium compound formed by treatment with an aqueous solution of a strong mineral caid and recovering said 3α-benzoxy-16α-methoxymethyl-pregnane-11,20-dione.

12. The process of producing 3α-acetoxy-16α-methoxymethyl-pregnane-11,20-dione which comprises the steps of reacting a solution of 3α-benzoxy-Δ16-pregnene-11,20-dione in anhydrous tetrahydrofuran with a methoxymethyl magnesium halide in the presence of mercuric chloride at a temperature between about —20° C. and about +20° C., hydrolyzing the intermediate magnesium compound formed by treatment with an aqueous solution of a strong mineral acid, recovering said 3α-benzoxy- 16α-methoxymethyl-pregnane-11,20-dione, saponifying said 3α-benzoxy-16α-methoxymethyl-pregnane-11,20-dione with an alcoholic alkali metal hydroxide, recovering 3α-hydroxy-16α-methoxymethyl-pregnane-11,20-dione, acetylating said hydroxy compound with an acetylating agent selected from the group consisting of acetic acid anyhdride and acetic acid chloride, an recovering said 3α-acetoxy-16α-methoxymethyl-pregnane-11,20-dione.

References Cited in the file of this patent
UNITED STATES PATENTS 2,671,794    Julian et al. _____ Mar. 9, 1954

UNITED STATES PATENT OFFICE
CERTIFICATION OF CORRECTION

Patent No. 2,980,714            April 18, 1961

Georges Muller et al.

It is hereby certified that error appears in the above numbered patent requiring correction and that the said Letters Patent should read as corrected below.

Column 2, lines 4 to 9, the upper right-hand portion of formula II. should appear as shown below instead of as in the patent:

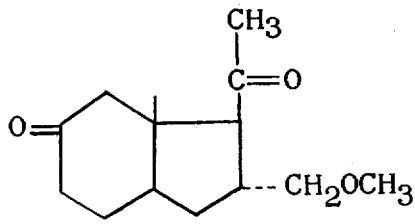

column 5, lines 48 to 52, the formula should appear as shown below instead of as in the patent:

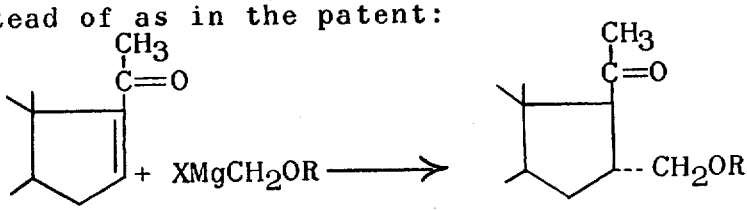

column 6, lines 33 and 57, for "proces", each occurrence, read -- process --; same column 6, line 65, for "caid" read -- acid --.

Signed and sealed this 17th day of October 1961.

(SEAL)
Attest:

ERNEST W. SWIDER
Attesting Officer

DAVID L. LADD
Commissioner of Patents